United States Patent
Brown et al.

(10) Patent No.: US 9,933,010 B2
(45) Date of Patent: Apr. 3, 2018

(54) TIERED AXIAL BEARING

(71) Applicant: Schaeffler Technologies AG & Co. KG, Herzogenaurach (DE)

(72) Inventors: James Kevin Brown, Rock Hill, SC (US); Dennis Roffe, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/005,206

(22) Filed: Jan. 25, 2016

(65) Prior Publication Data

US 2017/0211624 A1    Jul. 27, 2017

(51) Int. Cl.
| F16C 19/30 | (2006.01) |
| F16C 19/55 | (2006.01) |
| F16C 33/54 | (2006.01) |
| F16C 33/58 | (2006.01) |

(52) U.S. Cl.
CPC .......... *F16C 19/305* (2013.01); *F16C 19/55* (2013.01); *F16C 33/543* (2013.01); *F16C 33/586* (2013.01)

(58) Field of Classification Search
CPC ........ F16C 19/30; F16C 19/305; F16C 19/48; F16C 19/54; F16C 19/55; F16C 33/4605; F16C 33/543; F16C 33/586
See application file for complete search history.

(56) References Cited

U.S. PATENT DOCUMENTS

| 1,222,978 | A | * | 4/1917 | O'Connor | F16C 19/30 384/594 |
| 3,031,239 | A | * | 4/1962 | Pitner | F16C 19/30 384/623 |
| 3,328,098 | A | * | 6/1967 | Budzich | F16C 19/30 384/608 |
| 4,526,336 | A | * | 7/1985 | Durivault | A47B 81/065 248/349.1 |
| 4,733,979 | A | * | 3/1988 | Tsuruki | F16C 19/30 384/620 |
| 5,110,223 | A | * | 5/1992 | Koch | F16C 19/30 384/620 |
| 5,810,484 | A | * | 9/1998 | Bustamante | F16C 19/10 384/609 |
| 5,938,349 | A | * | 8/1999 | Ogawa | F16C 19/30 384/615 |

(Continued)

FOREIGN PATENT DOCUMENTS

| DE | 102010035784 A1 * | 3/2012 | ............. F16C 19/30 |
| JP | 11325083 A * | 11/1999 | ............. F16C 19/30 |

*Primary Examiner* — Alan B Waits
(74) *Attorney, Agent, or Firm* — Volpe and Koenig, P.C.

(57) ABSTRACT

An axial roller bearing includes a first bearing including a first cage and a first plurality of rollers and a second bearing including a second cage and a second plurality of rollers. The axial roller bearing further includes a first washer positioned on a side of the first bearing, a second washer positioned on a side of the second washer which is opposite from the side of the first bearing on which the first washer is positioned, and a connecting washer positioned between the first bearing and the second bearing. The first cage is attached at an inner side to the first washer and at an outer side to the connecting washer. The second cage is attached at an inner side to the connecting washer and at an outer side to the second washer.

10 Claims, 4 Drawing Sheets

(56) References Cited

U.S. PATENT DOCUMENTS

| | | | | |
|---|---|---|---|---|
| 6,116,787 | A * | 9/2000 | Muntnich | F16C 19/30 384/621 |
| 6,857,787 | B1 * | 2/2005 | Meier | F16C 19/10 384/619 |
| 7,104,699 | B2 * | 9/2006 | Shattuck | F16C 19/30 384/455 |
| 8,348,515 | B2 * | 1/2013 | Fugel | F16C 33/588 384/620 |
| 8,388,233 | B2 * | 3/2013 | Brown | F16C 33/4605 29/898.067 |
| 8,523,453 | B2 | 9/2013 | Loeschner et al. | |
| 8,821,028 | B2 * | 9/2014 | Fugel | F16C 35/06 384/621 |
| 8,827,566 | B2 * | 9/2014 | Takemura | F16C 19/30 384/621 |
| 2009/0252449 | A1 * | 10/2009 | Fugel | F16C 33/588 384/622 |
| 2016/0230809 | A1 * | 8/2016 | Roffe | F16C 43/04 |

\* cited by examiner

TIERED AXIAL BEARING

FIELD OF INVENTION

The present invention relates to a tiered axial bearing, and, more particularly, to a tiered axial bearing including interlocking components.

BACKGROUND

Axial roller bearings are provided in different applications to carry axial loads. In some applications, it is advantageous to stack multiple roller bearings in order to increase a load carrying capacity and speed capability of the axial roller bearing. For example, U.S. Pat. No. 8,523,453 to Loeschner et al. ("the '453 Patent") and U.S. Pat. No. 6,857,787 to Meier et al. ("the '787 Patent") disclose axial roller bearings that include two tiers of rolling elements.

The '453 Patent includes multiple disks that form bearing races and are held together by bolts. The '787 Patent also includes multiple disks that form bearing races which are loosely held together by a sleeve. While these designs allow for multiple tiers of roller bearings, they do not allow for a roller bearing that is both compact and securely held together, which is advantageous for both shipping and installation.

Therefore, it would be desirable to provide an axial roller bearing that overcomes other drawbacks of the prior art.

SUMMARY

In one aspect, an axial roller bearing assembly is provided. The axial roller bearing includes a first bearing including a first cage and a first plurality of rollers and a second bearing including a second cage and a second plurality of rollers. The axial roller bearing further includes a first washer positioned on a side of the first bearing, a second washer positioned on a side of the second bearing which is opposite from the side of the first bearing on which the first washer is positioned, and a connecting washer positioned between the first bearing and the second bearing. The first cage is attached at an inner side to the first washer and at an outer side to the connecting washer. The second cage is attached at an inner side to the connecting washer and at an outer side to the second washer.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
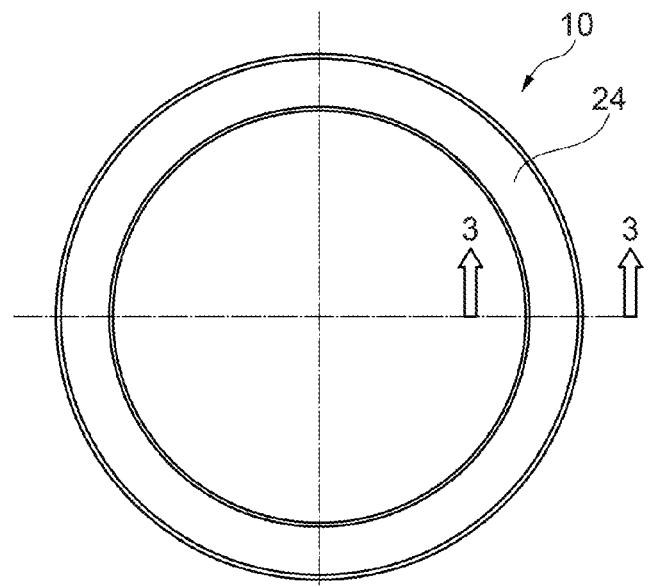
FIG. 1 is a plan view of an axial roller bearing.
Figure 2:
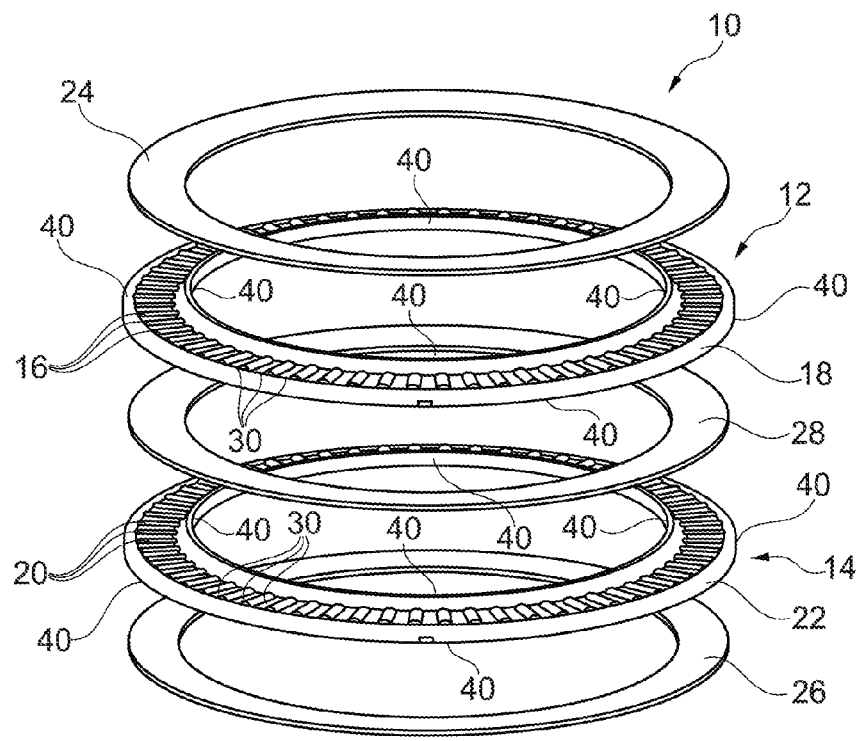
FIG. 2 is an exploded view of the axial roller bearing of FIG. 1.

FIGS. 1-2 depict an axial roller bearing assembly 10. The axial roller bearing assembly 10 may be used in conjunction with a rotating device to permit axial rotation and support an axial load. Axial roller bearing assembly 10 ("bearing assembly 10") is a tiered roller bearing including a plurality of stacked bearings. In an exemplary embodiment, the bearing assembly 10 includes a first bearing 12 and a second bearing 14.

The first bearing 12 includes a first plurality of rollers 16 which are spaced apart circumferentially from one another by a first cage 18. The second bearing 14 includes a second plurality of rollers 20 which are spaced apart circumferentially from one another by a second cage 22.

A first washer 24 which forms a first end of the bearing assembly 10 is positioned on a side of the first bearing 12. A second washer 26 which forms a second end of the bearing assembly 10 is positioned on a side of the second bearing 14 opposite from the side of the first bearing 12 on which the first washer is positioned. A connecting washer 28 is positioned between the first bearing 12 and the second bearing 14.

In an exemplary embodiment, the first bearing 12 and the second bearing 14 are axial needle roller bearings or axial cylindrical roller bearings, although other types of bearings are possible. The rollers 16 and first cage 18, and rollers 20 and second cage 22, may each be preassembled to form cage and roller assemblies. The first and second cages 18, 22 are preferably stamped from sheet metal, with pockets 30 that receive the rollers 16, 20.

The rollers 16, 20 are respectively located in at least some of the pockets 30 and roll against bearing races provided on the first washer 24, the second washer 26, and the connecting washer 28. For instance, the rollers 16 roll against bearing races formed by facing surfaces of the first washer 24 and the connecting washer 28 and the rollers 20 roll against bearing races formed by facing surfaces of the second washer 26 and the connecting washer 28. A lubricant may be positioned in between the bearing races and the rollers 16, 20.

The first bearing 12 and the second bearing 14 are configured to be secured to each other to create the tiered roller bearing assembly 10. The tiered roller bearing assembly 10 may be a preassembled unit that is capable of supporting greater load and speed capacity than an otherwise single roller bearing assembly. In order to secure the first bearing 12 to the second bearing 14, the first cage 18, second cage 22, first washer 24, second washer 26, and connecting washer 28 are interlocking.

Figure 3:
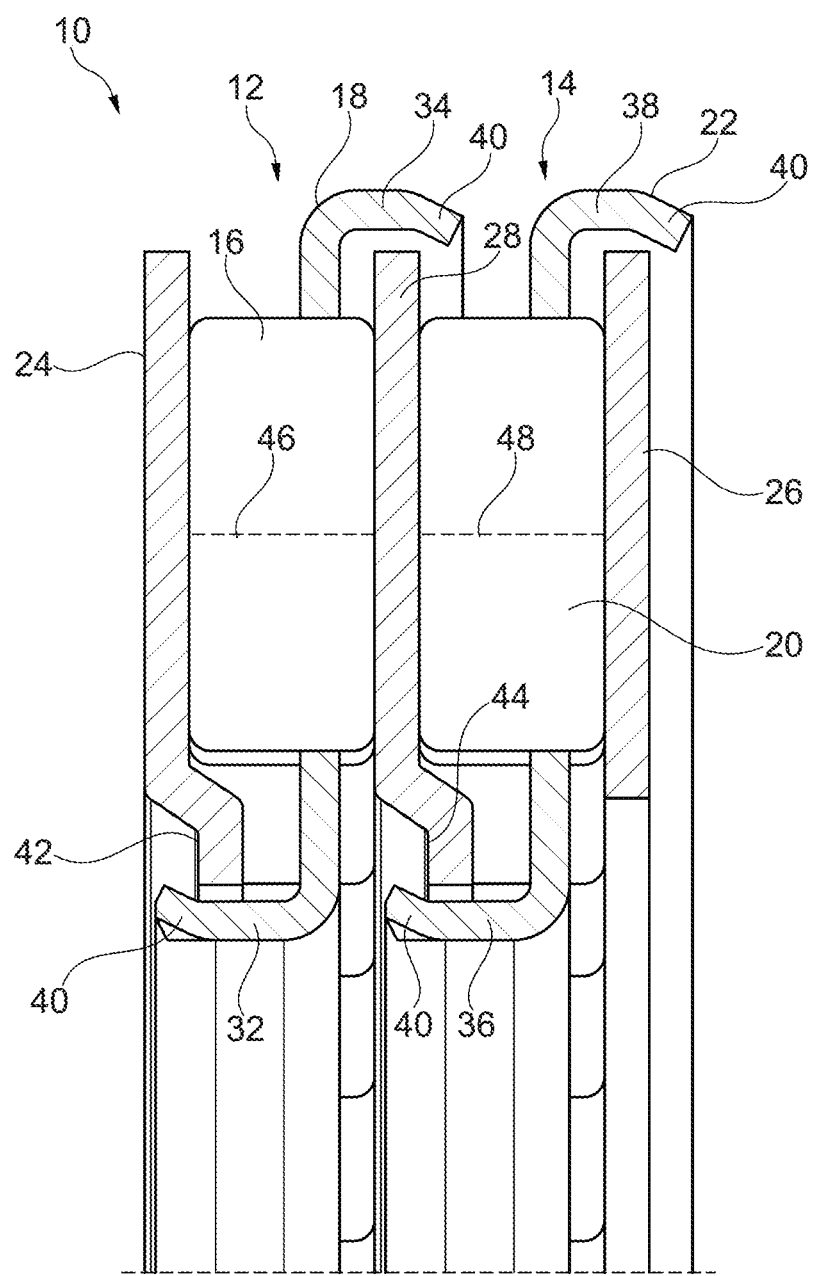
FIG. 3 is a cross-sectional view of the axial roller bearing taken along line 3-3 in FIG. 1, according to a first embodiment.

FIG. 3 depicts a cross-sectional view of the roller bearing assembly 10, illustrating the interlocking components (i.e., first cage 18, second cage 22, first washer 24, second washer 26, and connecting washer 28), according to a first embodiment.

As a matter of convention, each component includes an outer end located near a radially outer end of the bearing assembly 10 (i.e., the top of the figure) and an inner end located near a radially inner end of the bearing assembly 10 (i.e., the bottom of the figure).

As shown in FIG. 3, the first cage 18 is attached at an inner side to the first washer 24 and at an outer side to the connecting washer 28. The second cage 22 is attached at an inner side to the connecting washer 28 and at an inner side to the second washer 26.

In general, in order to attach the first bearing 12 to the second bearing 14, the bearing assembly 10 includes axially-extending flanges that extend over and toward a corresponding radially-extending flanges to "clip" thereto. As used herein, extending "over" means that an axially-extending flange overlaps a radially-extending flange in a radial direction. In the embodiment of FIG. 3, the shape of the first and second cages 18, 22 form the attachment mechanisms for securing the first bearing to the second bearing. As shown in FIG. 3, the first and second cages 18, 22 are S-shaped in order to form the axially-extending flanges.

The first cage 18 includes a first flange 32 that extends over and clips to the first washer 24 and a second flange 34 that extends over and clips to the connecting washer 28. In addition, the second cage 22 includes a third flange 36 that extends over and clips to the connecting washer 28 and a fourth flange that extends over and clips to the second washer 26.

In order to "clip" to the corresponding washer (i.e., the first washer 24, the second washer 26, or the connecting washer 28), each of the first, second, third, and further flanges, 32, 34, 36, 38, includes circumferentially spaced apart tab portions 40 at free ends thereof which are pressed toward the corresponding washer. The tab portions 40 provide for interlocking attachment of the components.

In some embodiments, the tab portions 40 are provided at least at four equally spaced apart locations (e.g., as shown in FIG. 2). The number and spacing of the tab portions 40 can however be varied. In other embodiments, one or more of the tab portions 40 may extend around an entire circumference of a corresponding flange (i.e., first flange 32, second flange 34, third flange, 36, or fourth flange 38).

In the embodiment of FIG. 3, the first washer 24 and the connecting washer 28 include offset flanges 42, 44, respectively, which form radially-extending flanges over which the first flange 32 and the third flange 36 extend and the tab portions 40 radially engage. In the case of the first washer 24, the offset flange 42 allows the first flange 32 to extend over the first washer 24 without extending past an outer surface formed by a non-offset portion of the first washer 24. In the case of the connecting washer 28, the offset flange 44 allows the third flange 36 of the second cage 22 to extend over the connecting washer 28 in a different plane than the second flange 34 of the first cage 18 extends over the connecting washer 28. As shown in FIG. 3, the second washer 26 is planar.

The shape of the cages 18, 22 and washers 24, 26, 28 provide the necessary bearing races for the rollers 16, 20 while allowing for interlocking attachment of the first bearing 12 to the second bearing 14 and promoting a compact bearing assembly 10 without the need for separate additional connecting parts.

Figure 3A:
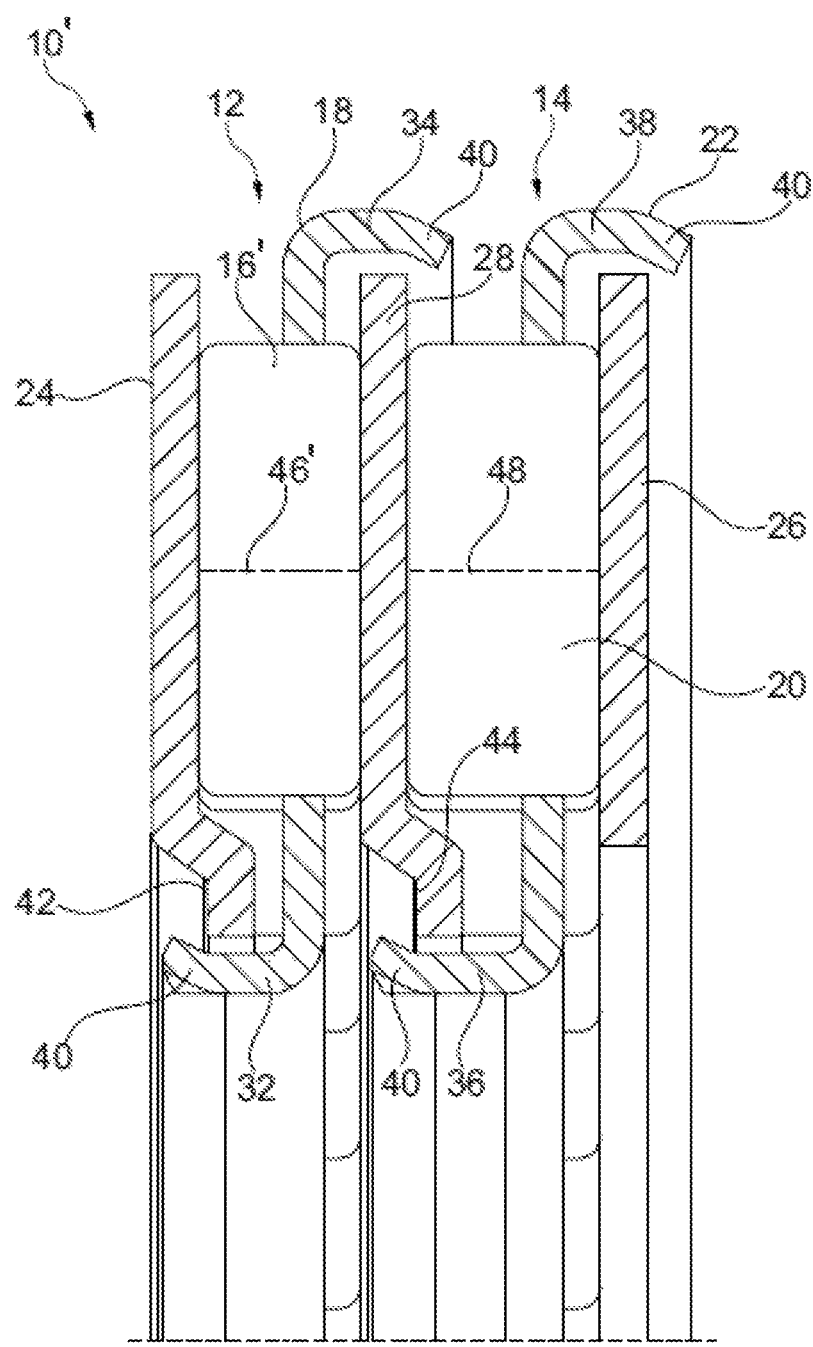
FIG. 3A is another cross-sectional view of the first embodiment of the axial roller bearing, including roller bearings with different diameters.

Further, the shape and configuration of the interlocking components simplifies production of a bearing assembly 10 of any overall width. For example, the first rollers 16 include a first diameter 46 and the second rollers 20 include a second diameter 48. The first diameter 46 may be different than the second diameter 48 such that bearings of different sizes may be combined to produce a bearing assembly 10 that includes a desired overall width. For example, FIG. 3A depicts an exemplary embodiment of a bearing assembly 10' that includes a first roller 16' that includes a first diameter 46' that is different than the diameter 48 of the second roller 20 that combine to produce a different overall bearing width.

The first, second, and connecting washers 24, 26, 28 may be punched or stamped from a bearing grade sheet metal, and then are de-burred or subjected to other surface treatment prior to being hardened and tempered. The first and second cages 18, 22 may also be stamped from sheet metal but can also be formed from a polymeric material, if desired. The rollers 16, 20 are preferably formed from hardened and tempered bearing grade steel.

It should be understood that the illustrated roller bearing assembly 10 is exemplary and that features thereof may be applied to form alternative roller bearing assemblies.

For instance, the arrangement and configuration of the components allow for further stacking of additional bearings. For example, an additional S-shaped cage with additional rollers may be clipped to the outer end of the first washer 24 and to an offset flange at an inner end of an additional washer (shaped like the first washer 24). In this way, the first washer 24 may act as another connecting washer. The use of additional bearings may increase a load and speed capacity and also increase the potential range of overall widths of the bearing assembly 10 that may be achieved.

Moreover, it should be understood that additional embodiments that include components that are the mirror image of the illustrated components are also contemplated.

Figure 4:
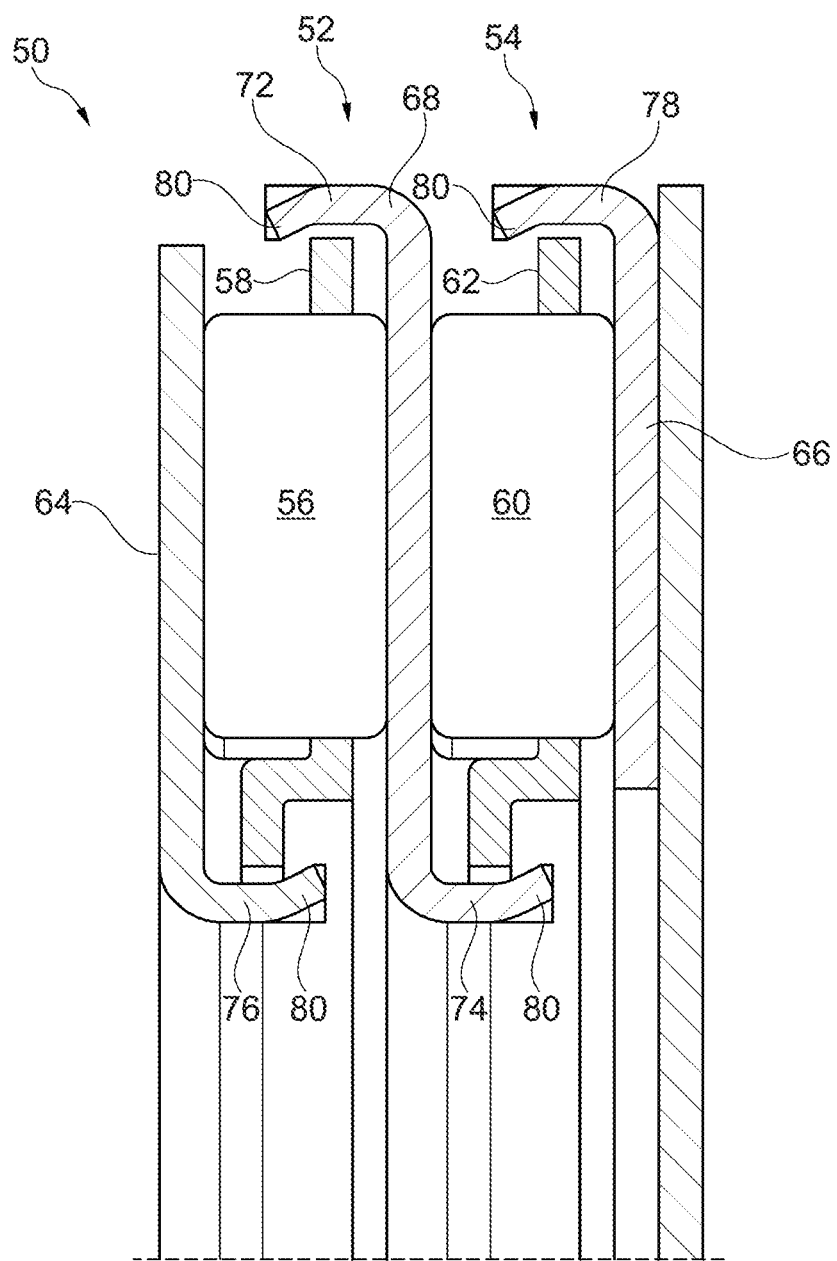
FIG. 4 is a cross sectional view similar to FIG. 3 of a second embodiment of the axial roller bearing.

In addition, the disclosed components (e.g., the first cage 18, the second cage 22, the first washer 24, the second washer 26, and/or the connecting washer 28) may include alternative shapes that produce a similar interlocking bearing assembly 10. FIG. 4 depicts such an alternative embodiment.

FIG. 4 depicts a bearing assembly 50 that includes a first bearing 52 connected to a second bearing 54. The first bearing 52 includes a first plurality of rollers 56 and a first cage 58. The second bearing 54 includes a second plurality of rollers 60 and a second cage 62. The bearing assembly 50 further includes a first washer 64, a second washer 66, and a connecting washer 68. As with the bearing assembly 10, the bearing assembly 50 includes the first cage 58 being attached at an inner side to the first washer 64 and at an outer side to the connecting washer 68, and the second cage 62 being attached at an inner side to the connecting washer 68 and at an outer side to the second washer 66.

However, in the embodiment of FIG. 4, the shape of the connecting washer 68 forms the attachment mechanisms for securing the first bearing to the second bearing. For example, the connecting washer 68 is S-shaped to form the axially-extending flanges which clip to radially-extending flanges formed by first cage 58 and second cage 62.

Connecting washer 68 includes a first connecting flange 72 and a second connecting flange 74. The first connecting flange 72 extends over and clips to the first cage 58 and the second connecting flange 74 extends over and clips to the second cage 62. The first washer 64 includes a third connecting flange 76 that extends over and clips to the first cage 58 and the second washer 66 includes a fourth connecting flange 78 that extends over and clips to the second cage 62. The first, second, third, and fourth connecting flanges each include circumferentially spaced apart tab portions 80 at free ends thereof which are pressed toward a corresponding cage (i.e., first cage 58 or second cage 62). The tab portions 80 are similar to tab portions 40 and provide for interlocking attachment of the components.

Having thus described various embodiments of the present tiered axial roller bearing assembly in detail, it is to be appreciated and will be apparent to those skilled in the art that many physical changes, only a few of which are exemplified in the detailed description above, could be made in the assembly without altering the inventive concepts and principles embodied therein. The present embodiments are therefore to be considered in all respects as illustrative and not restrictive, the scope of the invention being indicated by the appended claims rather than by the foregoing descrip- tion, and all changes which come within the meaning and range of equivalency of the claims are therefore to be embraced therein.

What is claimed is:

1. An axial roller bearing assembly, comprising:
    a first bearing including a first cage and a first plurality of rollers,
        the first cage including:
            a first axially extending flange at a radially inner end of the first cage, the first axially extending flange including a radially outwardly extending tab, and
            a second axially extending flange at a radially outer end of the first cage, the second axially extending flange including a radially inwardly extending tab;
    a second bearing including a second cage and a second plurality of rollers,
        the second cage including:
            a third axially extending flange at a radially inner end of the second cage, the third axially extending flange including a radially outwardly extending tab, and
            a fourth axially extending flange at a radially outer end of the second cage, the fourth axially extending flange including a radially inwardly extending tab;
    a first washer positioned on a side of the first cage;
    a second washer positioned on a side of the second cage that is opposite from the side of the first cage on which the first washer is positioned; and
    a connecting washer positioned between the first bearing and the second bearing including a single washer body forming a first bearing race contacting the first plurality of rollers and a second bearing race contacting the second plurality of rollers,
    wherein the first cage is attached at the radially inner end of the first cage to the first washer by the first axially extending flange, and at the radially outer end of the first cage to the connecting washer by the second axially extending flange,
    the second cage is attached at the radially inner end of the second cage to the connecting washer by the third axially extending flange, and at the radially outer end of the second cage to the second washer by the fourth axially extending flange, and
    the second axially extending flange, the connecting washer, and the third axially extending flange overlap in a radially extending plane.

2. The axial roller bearing assembly of claim 1, wherein the first axially extending flange extends over the first washer and the second axially extending flange extends over the connecting washer.

3. The axial roller bearing assembly of claim 2, wherein the third axially extending flange extends over the connecting washer and the fourth axially extending flange extends over the second washer.

4. The axial roller bearing assembly of claim 3, wherein the radially inwardly extending tab and the radially outward extending tab of the first cage, and the radially inwardly extending tab and the radially outwardly extending tab of the second cage are pressed toward a corresponding one of the washers.

5. The axial roller bearing assembly of claim 4, wherein the radially inwardly extending tab and the radially outwardly extending tab of the first cage, and the radially inwardly extending tab and the radially outwardly extending tab of the second cage are arranged at circumferentially spaced apart locations from each other.

6. The axial roller bearing assembly of claim 3, wherein the connecting washer includes a first offset flange.

7. The axial roller bearing of claim 6, wherein the first washer includes a second offset flange and the second washer is planar.

8. The axial roller bearing of claim 1, wherein the shape of the first and second cages form attachment mechanisms for securing the first bearing to the second bearing.

9. The axial roller bearing of claim 8, wherein the first and second cages are S shaped.

10. The axial roller bearing assembly of claim 1, wherein the first plurality of rollers includes a first diameter and the second plurality of rollers includes a second diameter, the first diameter being different than the second diameter.

\* \* \* \* \*